United States Patent [19]
Deckler et al.

[11] Patent Number: 6,148,747
[45] Date of Patent: Nov. 21, 2000

[54] EQUALIZING GAUGE WHEEL MECHANISM FOR ROW CROP PLANTER UNIT

[75] Inventors: Harry C. Deckler, Williamsburg; Alan F. Barry, Fairfax; Steven D. Rodgers, North English, all of Iowa

[73] Assignee: Kinze Manufacturing Inc., Williamsburg, Iowa

[21] Appl. No.: 09/234,631

[22] Filed: Jan. 19, 1999

Related U.S. Application Data

[60] Provisional application No. 60/071,975, Jan. 20, 1998.

[51] Int. Cl.⁷ .................................................. A01B 49/04
[52] U.S. Cl. ............................ 111/137; 111/164; 172/538
[58] Field of Search ................................... 111/137, 136, 111/135, 134, 190, 191, 192, 193, 194, 195, 196, 164; 172/538, 539, 520, 519, 239, 395, 421, 397; 403/70, 67

[56] References Cited

U.S. PATENT DOCUMENTS

| | | | |
|---|---|---|---|
| 2,685,243 | 8/1954 | Cole | 111/137 X |
| 4,374,500 | 2/1983 | Westerfield | 111/194 X |
| 4,404,918 | 9/1983 | Whalen et al. | 111/137 X |
| 4,430,952 | 2/1984 | Murray | 111/195 |
| 4,594,951 | 6/1986 | Grataloup . | |
| 5,235,922 | 8/1993 | Deckler . | |
| 5,427,038 | 6/1995 | Ege | 111/137 |
| 5,497,715 | 3/1996 | Meek et al. | 111/137 |
| 5,884,711 | 3/1999 | Shoup | 111/137 X |

*Primary Examiner*—Victor Batson
*Attorney, Agent, or Firm*—James J. Hill, Esq.; Emrich & Dithmar

[57] ABSTRACT

The wheel arms of a planter row unit are mounted to the row unit frame for independent pivotal motion. The ends of a saddle link are received in sockets formed on gauge wheel arms; and a yoke (or ring-shaped link) pivotally mounted to the frame engages a central saddle bearing surface on the saddle link. The wheel arms, saddle link and yoke are constructed and arranged such that when one gauge wheel raises when it encounters an obstruction, the other lowers and the frame raises by about one-half the distance which the first gauge wheel is raised.

11 Claims, 9 Drawing Sheets

EQUALIZING GAUGE WHEEL MECHANISM FOR ROW CROP PLANTER UNIT

RELATED APPLICATION

This application claims the benefit of the filing date of copending U.S. Provisional Application No. 60/071,975, filed Jan. 20, 1998.

FIELD OF THE INVENTION

The present invention relates to row crop planter units or the like having a pair of gauge wheels for determining the depth of a seed furrow. In particular, the invention pertains to a mechanism for equalizing the torque on the gauge wheel mounting arms as one gauge wheel encounters an obstruction or uneven ground.

BACKGROUND AND SUMMARY OF THE INVENTION

Equalizing mechanisms for the gauge wheels of a row unit for an agricultural planter are known. One such system is disclosed in Grataloup U.S. Pat. No. 4,594,951, issued Jun. 17, 1986, entitled "REGULARIZING DEVICE FOR THE DEPTH OF A FURROW". Another such system is disclosed in Deckler U.S. Pat. No. 5,235,922, issued Aug. 17, 1993, entitled "PLANTER WITH EQUALIZER BETWEEN GAUGE WHEELS". In the Deckler '922 patent, two embodiments of an equalizer gauge wheel are disclosed. In a first embodiment shown in FIGS. 1–4 of the '922 patent, an equalizer arm is rotationally mounted on a screw bolt which, in turn, is pivotally mounted to the planter frame. The equalizer arm is free to slide on, but is guided by, the screw bolt which, in turn, upon operator adjustment, determines the operating depth of a furrow opener. The gauge wheels are mounted for independent movement, and upper extensions of the gauge wheel mounting arms are connected to the outboard ends of the equalizer arm by means of a ball and socket arrangement whereby an upward motion of one gauge wheel results in a corresponding downward motion of the other gauge wheel.

The present invention is directed to a significantly different structure for accomplishing the same overall result— namely, permitting one gauge wheel of a planter row unit to rise when an obstacle or uneven ground is encountered by that gauge wheel but not the other, while permitting the other gauge wheel to remain in contact with the ground. The furrow opener then raises approximately one-half the distance it otherwise would raise if the gauge wheels were mounted so that both gauge wheels rise together when only one encounters an obstacle.

Whereas in the Deckler '922 patent, it is stated that the equalizer arm operates to maintain the load borne by the gauge wheels equally distributed between them, the present invention is directed to a system which, first, is designed to maintain a substantially equal torque on the gauge wheel arms when one gauge wheel is elevated above the other wheel, and, specifically, the present invention is intended to maintain equal torque on the gauge wheel arms for different height adjustments of the gauge wheels.

The present invention accomplishes these objects by means of a unique link, called a "saddle link" (because it has a bearing surface shaped like a saddle) which engages, during normal operation, and straddles a yoke in the form of a closed link. The yoke has one end mounted to the row unit shank frame to permit it to rotate in a vertical plane about a transverse horizontal axis and to sway slightly in a lateral direction. This possible motion of the yoke, coupled with its free interaction with the saddle link permits the saddle link to assume the complex, compound motion that is necessary for its intended operation at all the height adjustments of the gauge wheels. At each height adjustment, the saddle link shifts to a slightly different position and, therefore, its motion during use is changed. The present invention permits the mechanism to achieve all the required motions necessary to maintain a constant torque on the gauge wheel arms while, at the same time, permitting the saddle link to disengage from the yoke when the planter is raised and the gauge wheels fall relative to the row unit frame as they disengage the ground entirely. This, as will be described within, facilitates depth adjustment. When the row units are lowered to the use position, the shape of the saddle surface guides the saddle link into proper seating engagement with the yoke.

The ends of the saddle link have ball joints in which the cross sectional shape of the balls is oval, not round. The corresponding shape of the receptacles in the sockets in which the ball ends are received are rectangular with rounded corners. This combination of shapes permits a limited controlled rotation of the saddle link. In particular, it prevents the link from rotating completely about its axis to insure that the saddle link will always be properly reseated on the yoke when the saddle link is returned to its normal operating position. Moreover, the combination of saddle link and yoke enables a limited lateral sway of the saddle link during operation. Thus, the system is designed to be both reliable and durable, but to accommodate the wide range of motions and forces normally encountered by a row unit under the demanding conditions of normal field use. The conditions of use of a row unit during normal planting operation, particularly in fields prepared under minimum till or no till procedures, cannot be underestimated. It will also be appreciated that it is critical to crop success that planting be accomplished in a short "window" of time. It is highly undesirable to have breakdowns or to require timely adjustments or repairs during the planting window.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

In the drawing where there are both left and right side elements, the reference numeral used to refer to the right side element will be followed by an "A" to refer to the corresponding left side element, e.g., 29A, although a reference numeral including an "A" does not always mean the element has a right side counter-part.

DETAILED DESCRIPTION OF A PREFERRED EMBODIMENT

Figure 1:
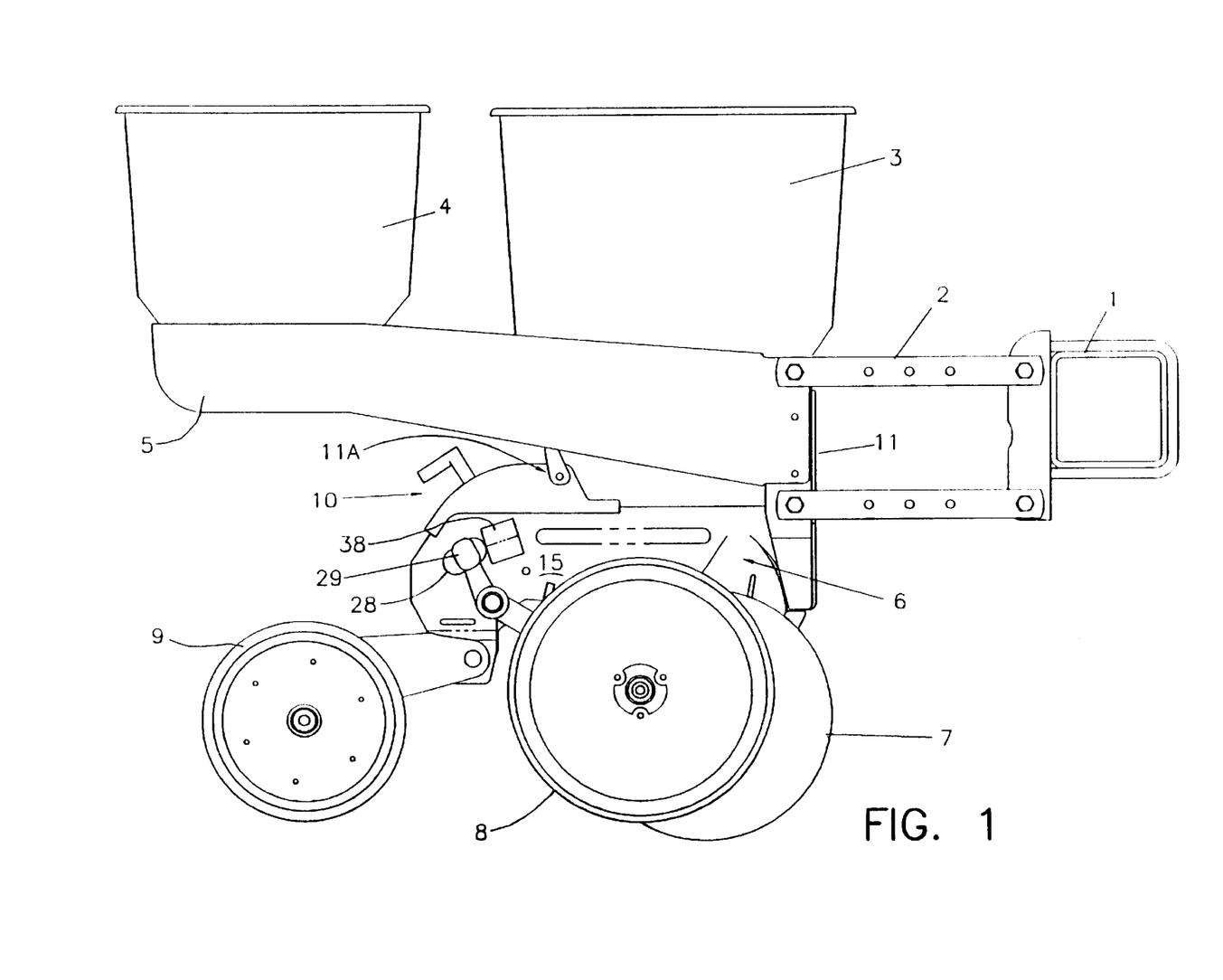
FIG. 1 is a right side elevational view of a planter row unit incorporating the present invention, the front of the unit being to the right.
Figure 6:
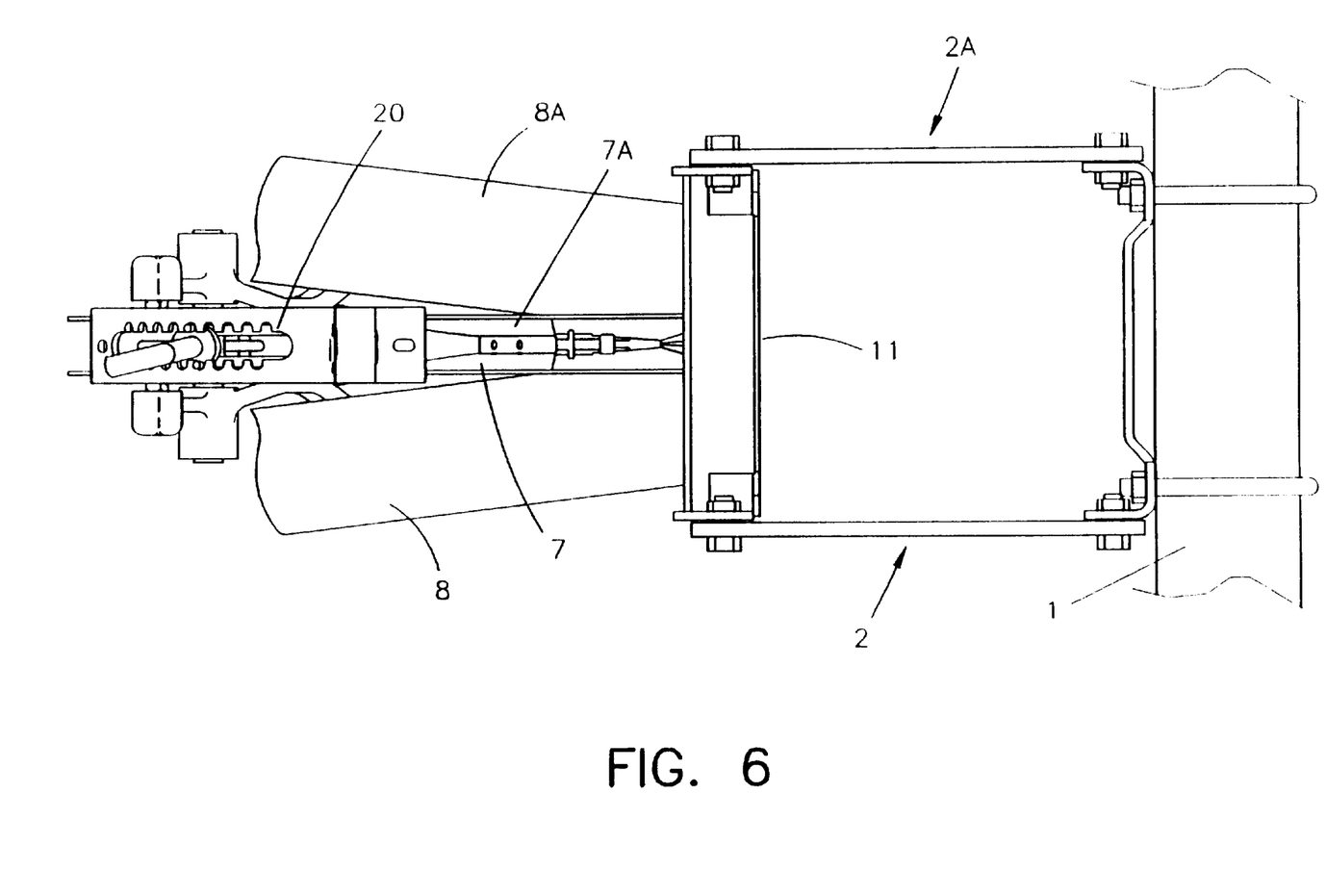
FIG. 6 is a top view of the row unit.

Referring first to FIGS. 1 and 6, a complete planter row unit is mounted to a tubular frame or toolbar 1 by a conventional right and left side four-bar linkages 2, 2A. A seed hopper 3 and an insecticide hopper 4 are supported by a hopper support weldment 5. Hopper support weldment 5 is mounted to the row unit frame 6 by a front mounting bracket 11 and intermediate support bracket 11A. The row unit frame 6 is a weldment and is sometimes referred to as the "shank". A pair of flat circular disc blades 7, 7A are mounted to the shank 6 to open a seed trench or furrow.

Figure 5:
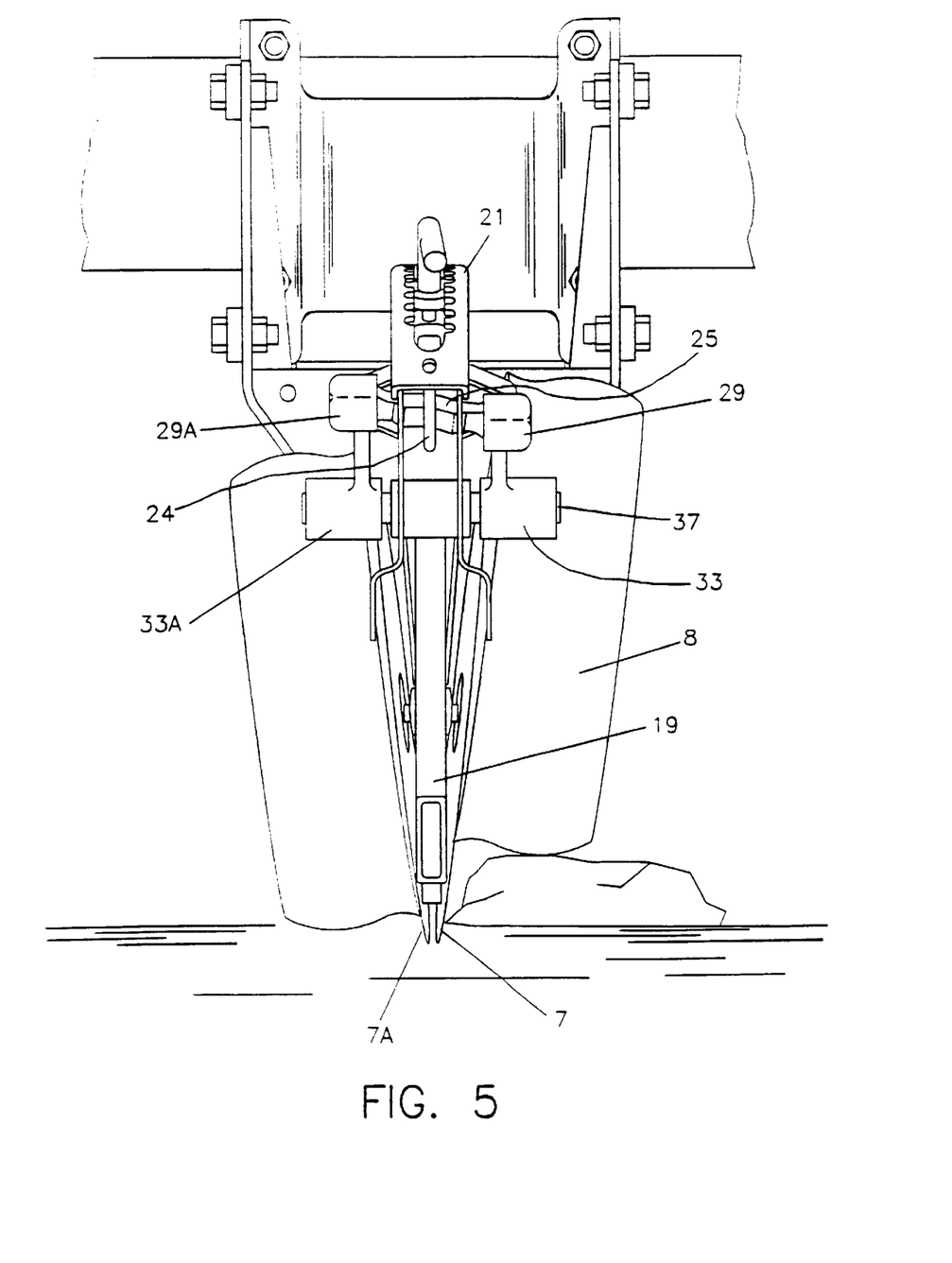
FIG. 5 is a rear view of the row unit showing the right gauge wheel encountering an obstacle.

As is also known in the art, a pair of depth gauge wheels 8, 8A are located adjacent to and slightly to the rear of the blades 7, 7A respectively. The gauge wheels, as they are called, are mounted to the shank as will be further described below for determining the depth of the furrow formed by the opener blades 7, 7A. A seed tube 19 (FIG. 5) extends from a seed meter (not shown) which "singulates" seed from the seed hopper 3 and deposits the seeds seriatim through seed tube 19 (FIG. 2) and into the furrow formed by the twin disc opener. A pair of closing wheels 9 follow after the seed is planted. The closing wheels are spaced adjacent the furrow for breaking down the furrow side walls formed by the disc/gauge wheel combination on either side of the furrow to cover the seed, close the furrow, and firm the soil over the covered seed. What has been described thus far is a general description of the structure of a conventional planter row unit.

According to the present invention, the depth of opener discs 7 is adjusted through a lever mechanism 10 which changes the vertical height of the shank 6 relative to gauge wheels 8 which ride on the ground. Opener discs 7 are carried by the shank, so the lever mechanism 10 adjusts the operating depth of the blades 7 relative to the gauge wheels, and thus the top surface of the soil.

Figure 11:
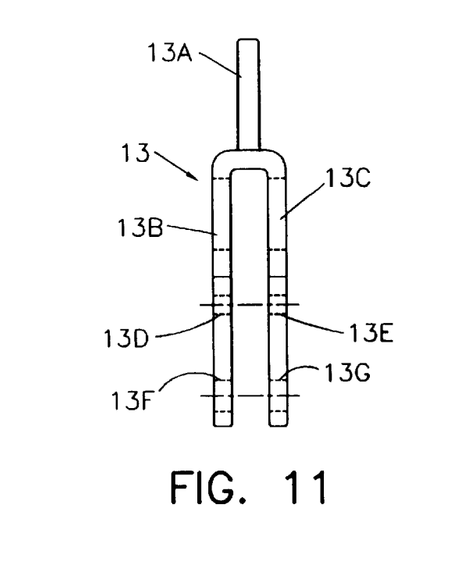
FIG. 11 is a rear view of the depth adjusting link turned on its side.

The shank 6 includes two side panels 15, 15A, the right side panel 15 being cut away at 6A to show the structure of the depth-adjusting lever mechanism 10. The spindles 12 of opener discs 7 are mounted in the side panels 15, 15A as is also known. The mechanism 10 includes a bifurcated lever 13, seen from the rear and turned on its side in FIG. 11 to include a shank 13A in the form of a rod extending upwardly from a lower forked portion having first and second spaced sides 13B, 13C. The sides 13B, 13C include an upper pair of aligned apertures 13D, 13E, respectively, as well as a lower pair of aligned apertures 13F, 13G, respectively. The lower apertures 13F, 13G receive a pivot pin 14 which is pressed into receiving apertures in the side panels 15, 15A of the shank frame 6, permitting the lever 13 to rotate about a horizontal transverse axis defined by the pivot pin 14. The upper apertures 13D, 13E of the lever 13 carry a second pivot pin 32 which is free of the shank frame 6 and rotates with the lever 13, as will be described further below.

A handle generally designated 16 (FIG. 3) has a collar 17 with upwardly extending projections 18, 18A formed at its base. The handle 16 is tubular in form and includes an upright portion 16A and a rearwardly extending grip 16B. A spring 22 is received on the shank 13A of the lever 13, and it is located between the lower forked portion of the lever and the bottom of the collar 17 of the handle.

The central opening of the upright portion of the tubular handle 16 is slidingly received on the shank 13A of the lever 13, compressing the spring 22 which urges the handle upwardly. The collar 17 of the handle 16 is held beneath a cover 21 which is mounted on the shank 6 and includes a slot forming a rack designated 20 in FIG. 6.

Figure 7:
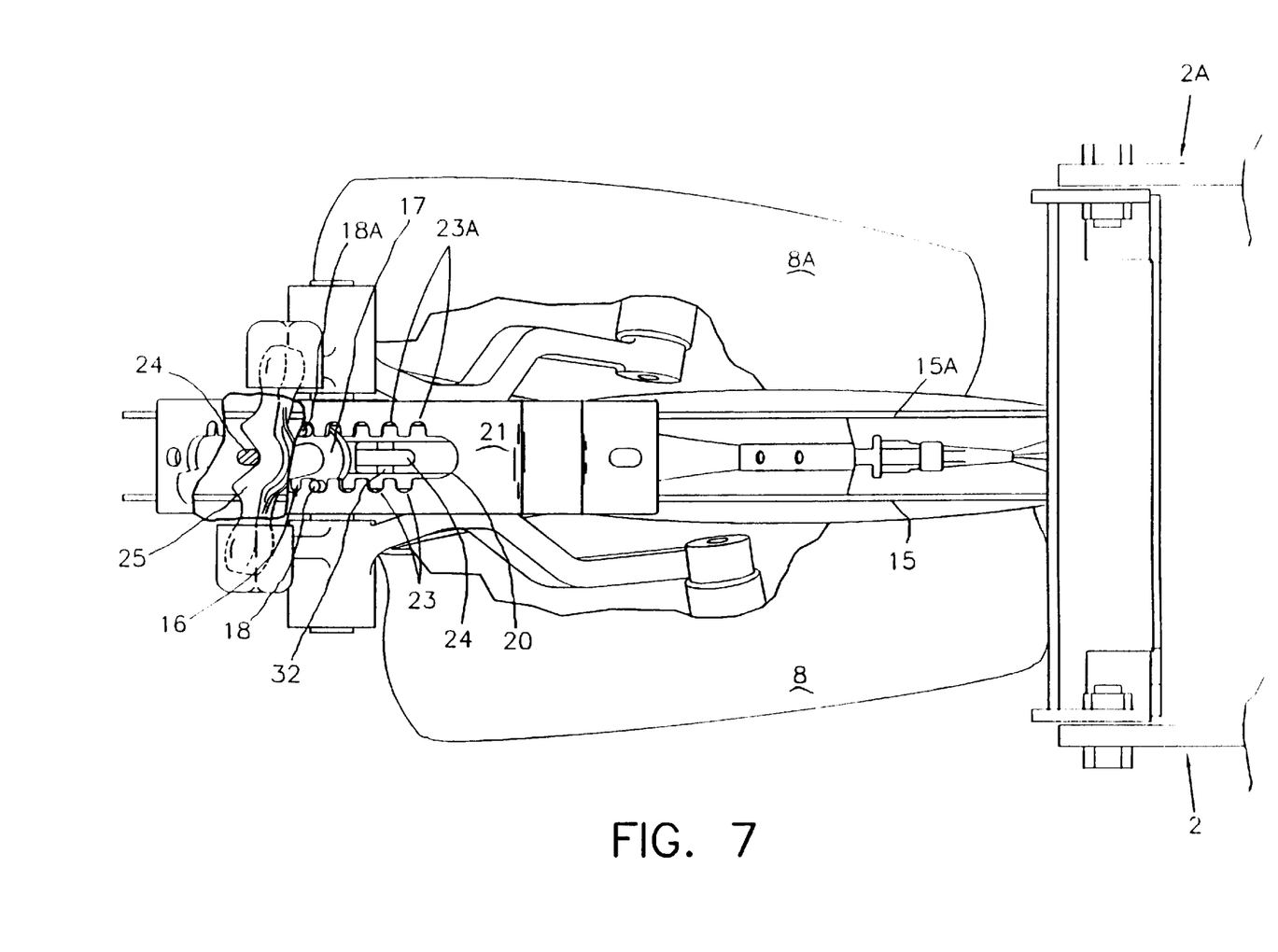
FIG. 7 is a close-up view similar to FIG. 6, but with a portion of the mounting linkage omitted and partially cut away to show the pivot mechanism, and with the gauge wheels in the position shown in FIG. 5.

As best seen in FIG. 7, the rack 20 has a set of adjusting notches 23 on the right side, and a set of adjusting notches 23A on the left side. The notches 23, 23A are offset relative to one another as best seen in FIG. 7, and they are designed to receive the projections 18, 18A respectively on the collar 17 of the handle 16. The offset arrangement permits easier adjustment of the furrow depth and in small increments, as will be appreciated from a complete understanding of the structure.

To make an adjustment, the operator holds the grip 16B of the handle 16 and depresses the handle on the shank 13A of the lever 13. This lowers the collar 17 and disengages the projections 18, 18A from the adjusting slots 23, 23A of the rack 20. The operator may then pivot the handle and lever 13 about the pin 14 (which is pinned to the shank frame 6 by means of a bolt and a bushing) to rotate the handle. Rotation of the handle 16 to the rear in a counterclockwise direction (as viewed from the right in FIG. 2) raises the gauge wheels 8, 8A (i.e., lowers the discs relative to the gauge wheels) and thus increase the furrow depth, as indicated by the arrow D in FIG. 4 which shows a maximum depth. If the handle 16 is rotated clockwise (i.e., moved forwardly) it reduces the furrow depth, as seen at D in FIG. 2, in which the adjusting mechanism is at the minimum depth setting. In FIG. 3, the depth adjustment is seen at an intermediate setting.

Figure 2:
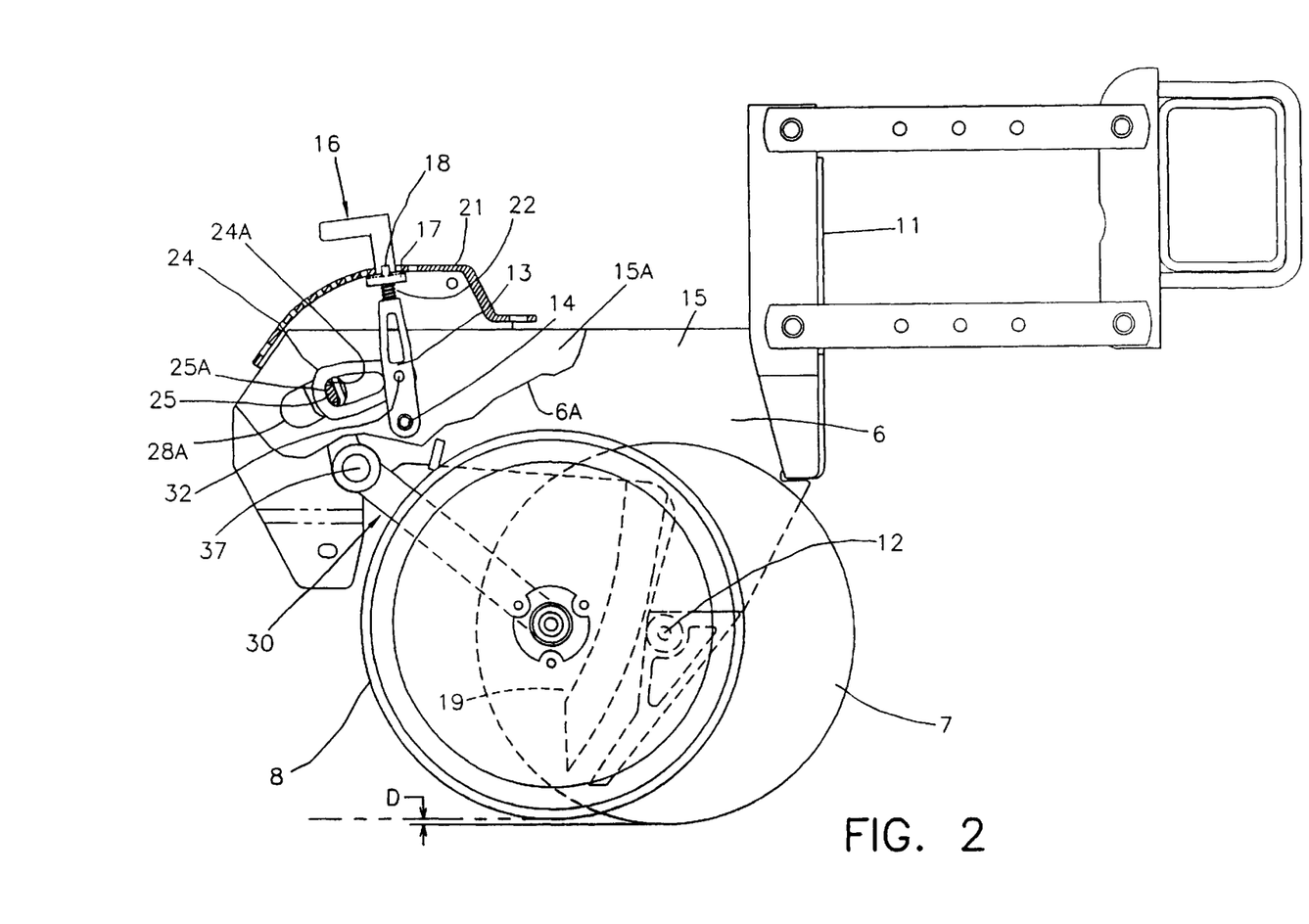
FIG. 2 is a view of the row unit similar to FIG. 1, with the gauge wheels adjusted for minimum furrow depth, D, and with the shank partially cut-away and the hoppers and hopper support weldment omitted.
Figure 3:
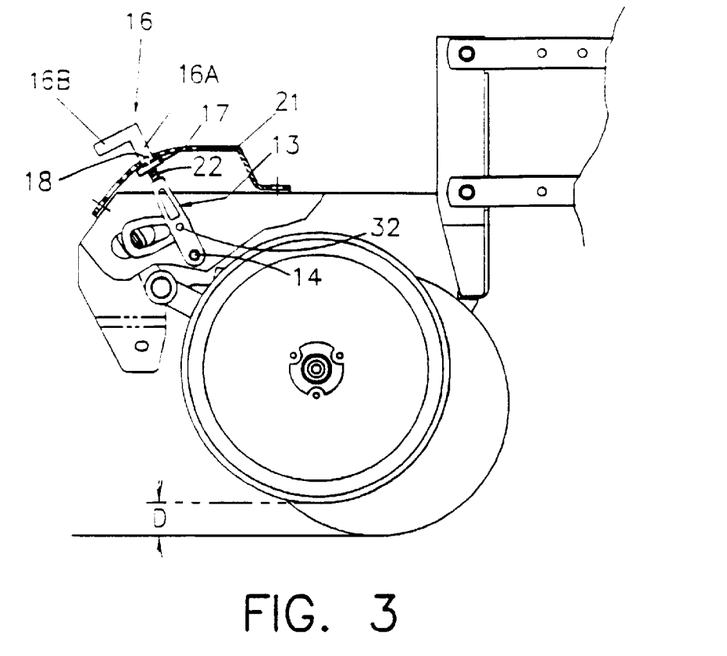
FIG. 3 is the same view as FIG. 2 with the gauge wheels adjusted for mid-range planting depth.
Figure 8:
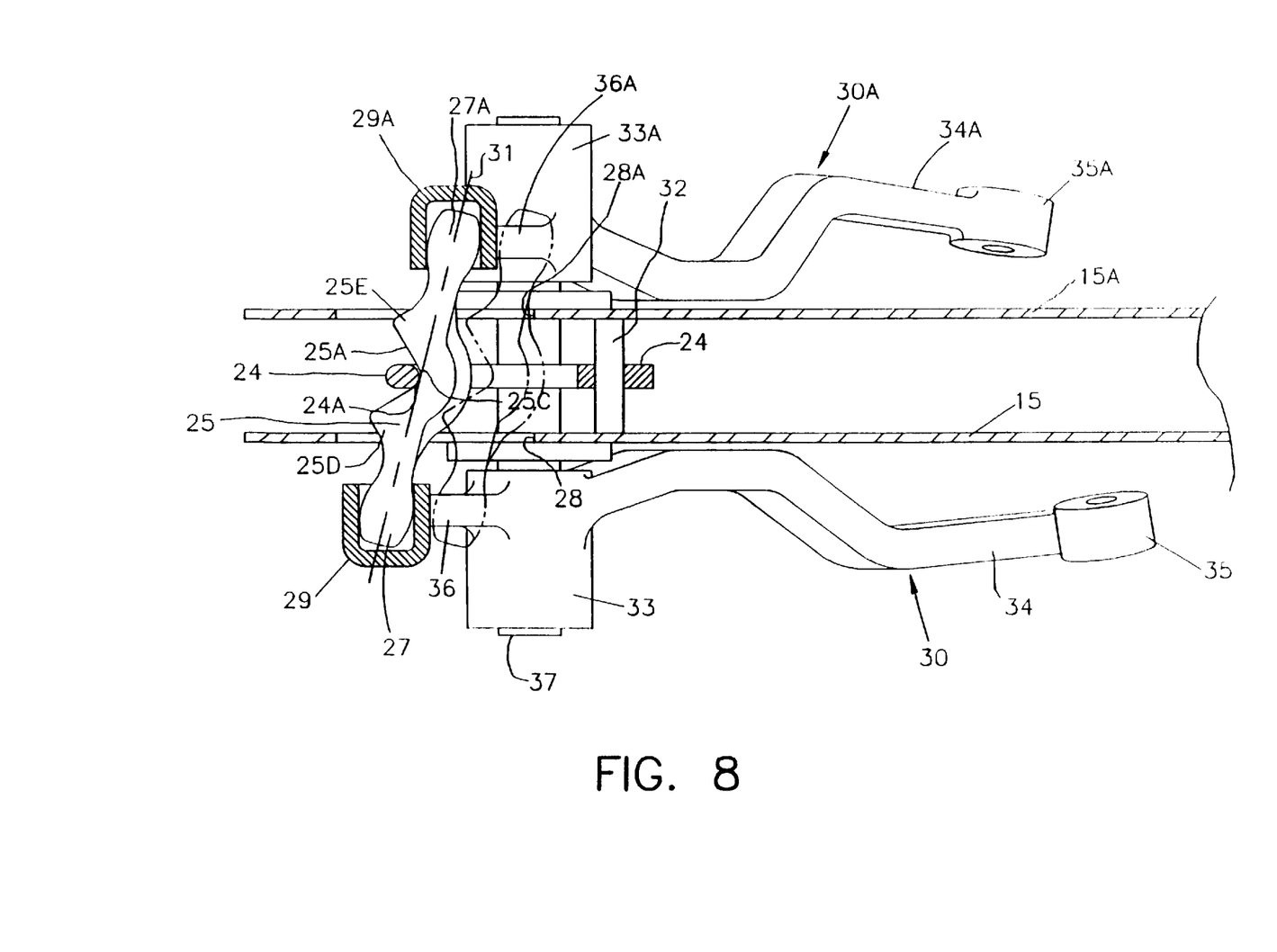
FIG. 8 is a close-up top view of the gauge wheel arm pivot mechanism, showing the gauge wheel arm sockets and the yoke in cross section.

A closed link or loop 24, referred to as a yoke or first link, is characterized as having an open central portion, as seen in FIG. 2, with the opening increasing from front to rear. The yoke 24 is pinned to lever 13 at pin 32, permitting the yoke to rotate in a generally vertical plane and to sway slightly laterally, as will be described. The rear of the central opening in the yoke 24 provides a first bearing surface 24A which is curved in a vertical direction and in a horizontal direction, with the radius of the horizontal curvature being smaller. The curved bearing surface 24A acts as a support and fulcrum for a second link 25 which is referred to as a saddle link because the center of the rear surface of the link 25 is formed in the general shape of a saddle to provide a second bearing surface 25A as can be seen from a comparison of FIGS. 2 and 8. That is, the bearing surface 25A of the saddle link 25 is rounded to a convex shape in a generally vertical plane (parallel to the plane of the page of FIG. 2) to receive the curved bearing surface 24A of the yoke 24 (simulating the legs of a rider) in a rocking engagement, and the saddle surface 25A is rounded in a concave open outwardly and rearwardly when viewed from the top as seen in FIG. 8. These two curvatures define the saddle bearing surface 25A, and define a saddle point 25C in FIG. 8 which is a point (actually a small area) which engages the curved bearing surface 24A of the yoke 24. As seen in FIG. 8, the bearing surface 24A is not only curved in a vertical direction, but it is rounded in a rearward direction (to the left in FIG. 8) to accommodate the saddle surface 25A of the saddle link 25 and permit the rocking motion while centering the saddle link on the yoke and providing a smoothed, bearing interface between the two members while they are in load-bearing engagement. Moreover, this rocking engagement without any direct connection such as a pin or pivot is maintained over a wide range of adjusted depth positions for the gauge wheels and a broad range of motion for those wheels.

Still referring to FIG. 8, it will be observed that the saddle link 25 defines a right projecting ear 25D and a left ear 25E which extend rearwardly of the saddle point 25C and laterally thereof to form a centering guide for the saddle link 25 onto the bearing surface 24A of the yoke 24 should the two members disengage, as is possible because it will be appreciated that there is only a bearing contact between the saddle link 25 of the yoke 24.

As will be described further below, when the toolbar is raised to the transport or field turn positions, the gauge wheels lower under gravity, and the saddle link 25 disengages the bearing surface 24A of the yoke 24. The shape and configuration of the saddle surface 25A of the saddle link and the bearing surface 24A of the yoke, together with the structure which secures the ends of the saddle link, insure proper re-seating of the saddle link on the yoke when the planter is lowered to the use position.

The right and left ends of the saddle link 25 are provided respectively with a ball 27 and a ball 27A. The saddle link 25 extends through slots 28, 28A respectively in the side plates 15, 15A of the shank frame. The balls 27, 27A are received respectively in sockets 29, 29A of right and left gauge wheel mount arms 30, 30A.

As seen in FIG. 8, the axis of the saddle link is designated by reference numeral 31, and it passes through the centers of the balls 27, 27A, and through the saddle point 25C of the saddle surface 25A. The purpose of this will be discussed below.

Figures 9A, 10A:
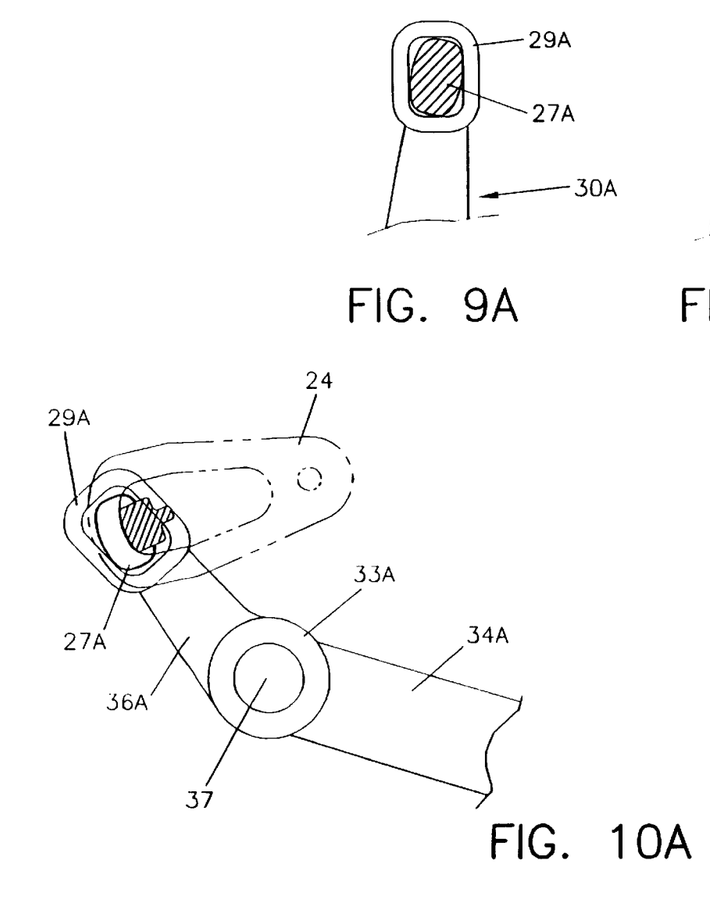
FIGS. 9A–9B are fragmentary close-up side views illustrating the limited range of rotation of the saddle link within the wheel arm sockets.
FIGS. 10A–10B are close-up, diagrammatic, fragmentary side views of the gauge wheel arm, yoke (in phantom) and saddle link (in cross section) illustrating the motion of the saddle point for various depth settings.
Figures 9B, 10B:
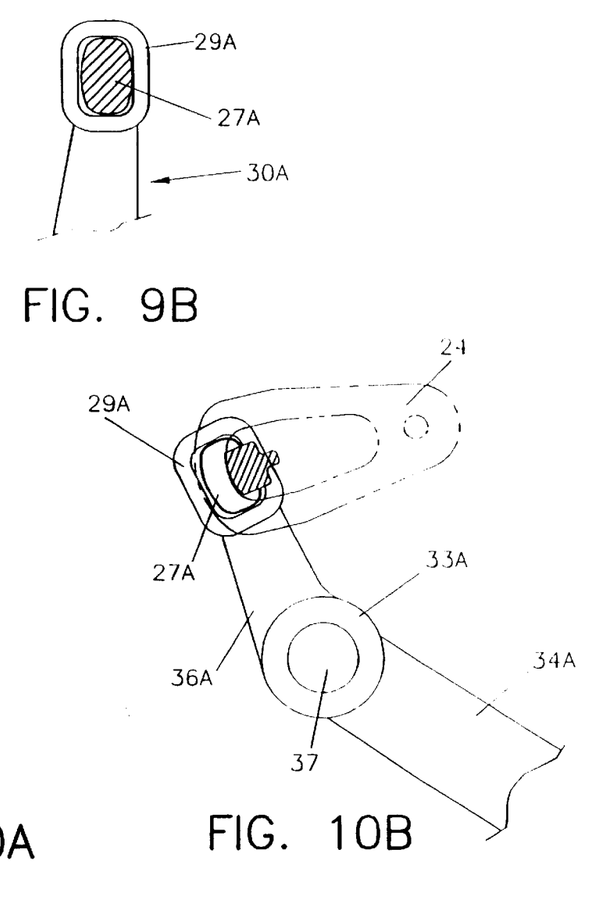

Turning now to FIGS. 9A and 9B, it can be seen that the cross section of the ball 27A, taken at its largest cross section and perpendicular to the axis 31, is oblong or generally oval. That is, it has a height greater than its width and the corners are rounded, forming fillets. All surfaces present smooth bearing surfaces. The hollow receptacle of the socket 29A similarly has a generally rectangular side wall with rounded corners. The ball 27A is loosely fit within its associated socket 29A and the two are dimensioned such that the saddle link may rotate about its axis over a limited angle, the limit being shown in FIG. 9A for a clockwise rotation of the ball 27A. The reason for limiting rotation of the link is that, as mentioned above, it is possible for the saddle link 25 to disengage entirely from the yoke 24 under certain conditions, as when the planter is raised. When the planter is again lowered, however, the restraint on rotation of the saddle link 25 about its axis insures that the saddle surface 25A will be reseated onto the bearing surface 24A of the yoke 24.

In summary, the ball ends of the saddle link are generally oval in shape with filleted corners and edges; and they are constructed and arranged, in combination with their associated sockets on upper extensions of the gauge wheel arms, to permit rotation of the saddle link about its axis, but to limit that rotation. This insures that the saddle surface of the link will always be in contact with the curved bearing surface of the yoke or properly re-seated if they do disengage. Moreover, as the saddle link rotates, translates and pivots in its normal range of motion, the ball ends of the saddle links also slide, rotate and pivot within the socket 29.

Turning now to the gauge wheel arms 30, 30A, each arm includes a main hub 33, 33A respectively, a forwardly and downwardly projecting arm 34, 34A respectively, and a forward hub 35, 35A respectively which receive the shafts of the associated wheel spindles of the gauge wheels 8, 8A (FIG. 7).

Turning to FIG. 8, the sockets 29, 29A are mounted to the main hubs 33, 33A of the gauge wheel arms by upper extension arms 36, 36A. The main hubs 33, 33A of the gauge wheel arms are mounted to a common spindle 37 which is received in and secured to the side plates 15, 15A of the shank.

A stop member 38 (FIG. 1) is welded to the right side of side plate 15 of the shank 6 and engages and stops the forward motion of the socket 29 of the wheel arm.

OPERATION

In order to facilitate making a depth adjustment, if the planter is elevated to a raised or transport position, the weight of the gauge wheels 8, 8A causes the wheel arms 30, 30A to rotate clockwise—that is, because there is no direct connection between the saddle link 25 and the yoke 24, the upper arm sections 36, 36A and the sockets 29, 29A are free to move upwardly and forwardly, carrying the saddle link 25 to a forward position thereby disengaging the saddle bearing surface 25A from the bearing surface 24A of the yoke 24 to the position shown in phantom in FIG. 8.

When the saddle link is in the normal use position, it engages the yoke 24 because the weight of the row unit is being borne by the gauge wheels, causing the wheel arms to rotate counterclockwise and forcing the saddle link into engagement with the yoke. With the planter raised, however, the saddle link moves forwardly and disengages the yoke so that resistance to moving the yoke is decreased. Thus, the handle 16 may be depressed, disengaging the projections 18, 18A from the slots 23, 23A of the rack 20 against the action of spring 22. The adjusting lever 13 may then be rotated about its pivot 14 to the desired adjusted position.

Figure 4:
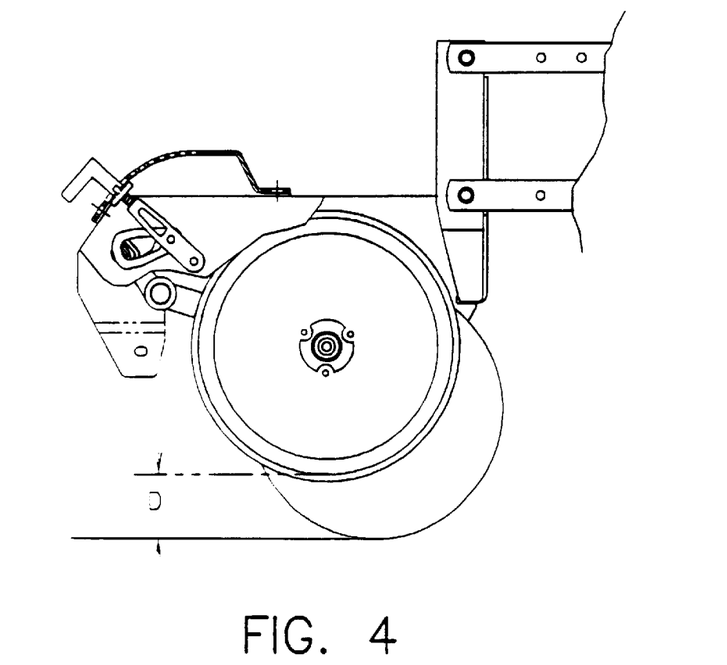
FIG. 4 is the same view as FIGS. 2 and 3 with the gauge wheels adjusted for maximum planting depth.

When the adjusting lever 13 is moved to the forward position shown in FIG. 2, the yoke 24 is moved forwardly, limiting or restraining the rearward motion (or translation) of the saddle link, and thus limiting the counterclockwise rotation of the wheel arms when the planter is lowered to the use position. This defines a minimum furrow depth, as indicated by the arrow D. When the adjusting lever 13 is moved to an intermediate position as shown, for example, in FIG. 3, the yoke is moved rearwardly, permitting the saddle link to move more toward the rear when the planter is lowered to the use position, and also permitting the gauge wheel arms to rotate counterclockwise more than is seen in FIG. 2. Thus, the planting depth, as represented by the arrow D, increases. When the adjusting lever 13 is moved to the rearmost position as seen in FIG. 4, planting depth is at a maximum for the reasons indicated. It will be observed that the curvature of the cover 21 in which the rack is formed by be curved to a radius centered at the pivot point 14.

In order to fully understand the invention, it must be understood that there are three different types of motion of the saddle link 25 during normal field operation. It will be appreciated that a planter row unit is pulled through a field at a fairly significant speed, of the order of 4–6 miles per hour. Some fields are more rocky or uneven than others, and a commercial planter is designed to endure the worst case. If one gauge wheel encounters an obstacle such as a rock, that wheel can be raised abruptly, causing the saddle link to pivot, as the socket which captures the end of the saddle link associated with the gauge wheel encountering an obstacle, is driven downwardly and rearwardly, causing the other socket to move upwardly and forwardly, permitting the other gauge wheel to remain in contact with the soil. This has three distinct advantages. First, when one gauge wheel is raised by a given distance, if the other gauge wheel remains in contact with the ground, the disc opener is raised only one-half the distance by which the elevated wheel is raised. If there were no equalizing structure, the furrow opener (or other soil engaging tool) would be raised by the same distance that the wheel is elevated, creating a larger discontinuity in the depth of the seed trench being formed.

Secondly, by permitting that wheel which does not encounter the obstacle, to remain in contact with the ground, the weight of the row unit is more equally distributed between both wheels. Although the weight may not be truly equally divided between the two gauge wheels when an obstacle is encountered, the system remains in balance because the torque on the two wheel arms remains substantially equal. Third, by maintaining that wheel which does not contact the obstacle in contact with the ground, that wheel continues to function in cooperation with the disc opener to form the furrow wall on its associated side of the seed trench.

For all depth adjustments, when the equalizing gauge wheel system of the present invention is in operation, the saddle surface 25A of the saddle link 25 will normally be in engagement with the curved bearing surface 24A of the yoke 24 and permit the link 25 to rock on the yoke which supports it, although in extreme conditions, when one wheel is raised to a limit, the saddle link may disengage the yoke. In such a condition, the saddle link will, nevertheless, return to its intended seated, rocking engagement with the yoke, guided by the ears 25D, 25E.

When the row unit is in planting operation, the motion of the saddle link 25 does not remain in a single plane for a given depth setting. Rather, the saddle link undergoes a complex motion which need not be described in detail, a general description will suffice for an understanding of the invention. In general, the axis of the saddle link, as described above and represented by the chain line 31 in FIG. 8, pivots or rocks in a plane which is perpendicular to a line extending between the axis of rotation of the main pivot 37 of the gauge wheel mounting arm (the axis of spindle 37) of the gauge wheel mounting arm, and the point of engagement of the saddle surface 25A of the saddle link and the curved bearing surface 24A of the yoke. This line is drawn in FIG. 12 and designated by reference numeral 41 for a mid-range depth setting. If the gauge wheels are lowered for reducing the furrow depth, the imaginary line 41 moves to the position 41A; and if the furrow depth is increased (by moving the gauge wheel counterclockwise about its main spindle), the imaginary line moves to the position 41B.

The axis of the saddle link, then, moves or rocks generally in a plane perpendicular to the line 41 and passing through the area of contact between the saddle link and the yoke. For the depth setting shown in FIG. 12, the plane is designated 42 when the pivot axis is as shown at 41. When the pivot axis moves to the location designated 41A, the pivot plane is shown at 42A; and when the pivot axis moves to the position in 41B, the plane of motion rotates to the position shown at 42B.

Figure 12:
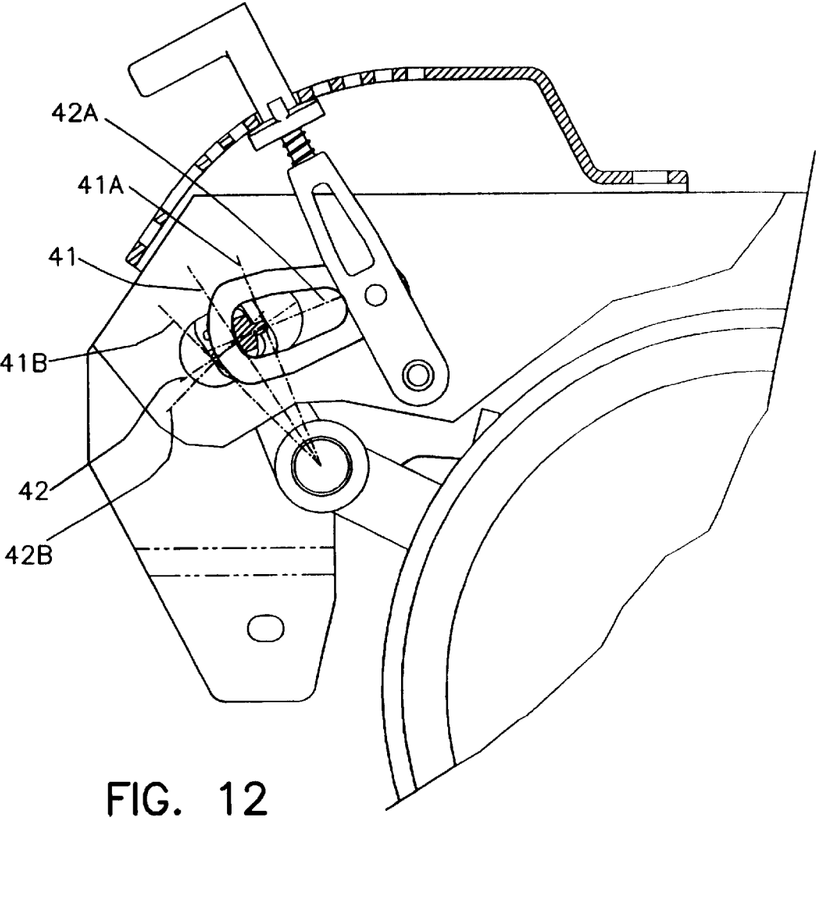
FIG. 12 is a close-up right side view of the saddle link and yoke illustrating the generalized planes of motion of the axis of the saddle link for various depth settings of the gauge wheels.

Assuming that the depth setting is such that the pivot axis of the saddle link is as represented by the line 41, and that the general plane of motion of the axis of the saddle link is along the plane 42, it will be appreciated that as the right gauge wheel is raised, the right side of the saddle link will be moved rearwardly and downwardly below the plane 42, whereas the left gauge wheel will have a relative motion which is downward (that is, relative to the axis of rotation of the gauge wheel arm about the spindle 37, for example). The downward motion of the left gauge wheel will cause the left gauge wheel arm 30A to rotate clockwise (when viewed from the right side) so that the socket on the upper arm extension will move the left side of the saddle link forwardly and slightly upwardly also, because the center of the socket moves in a circle about the axis of the center of the spindle 37. Thus, the axis of the saddle link may move slightly downwardly below the plane 42, and the saddle link may slide downwardly on the yoke or the yoke may rotate slightly counterclockwise (as viewed from the right) to accommodate this motion. But even when the saddle link does move relative to the yoke, the rocking motion at the interface between the two links is maintained.

It will also be appreciated that the saddle link may move laterally in the direction of its axis, as illustrated, for example, in FIG. 8 wherein the right side ball 27 of the saddle link is seated further in its associated socket, and the left ball 27A is moved slightly outwardly of its associated socket. Because the mounting of the yoke 24 and its associated pivot pin 32 is a loose fit, the yoke 24 may sway laterally under the various range of motion of the saddle link. This lateral motion is sometimes referred to a translation of the saddle link, and it occurs in the direction of the axis 31 of the saddle link, as mentioned. If the saddle link should translate laterally, because of the structure described, proper contact between the saddle surface 25A of the saddle link and the curved bearing surface 24A of the yoke 24 will be maintained. Translation of the saddle link is limited by the end surfaces of the sockets 29, 29A of the upper extensions of the gauge wheel arms.

A third type of motion of the saddle link is that it may rotate about its axis 31. However, rotational motion of the saddle link, though permitted in order to accommodate the saddle link to the various motions it will encounter under normal use condition, is limited by the oval cross section of the balls 27, 27A and the cooperating rectangular cross section of the receptacles of the sockets 29, 29A, as previously described in connection with FIGS. 9A and 9B and 10A and 10B.

It will be appreciated that in the illustrated embodiment, the saddle link 25 is coupled to the gauge wheel arms by means of upper extensions 36, 36A which are located above the axis of rotation (spindle 37) of the gauge wheel arms. Persons skilled in the art will recognize that the upper extensions of the wheel arms could be eliminated and the saddle link coupled to or engage the main wheel arms 34, 34A. In such a configuration, the ends of the saddle link could be received in sockets similar to the ones shown at 29, 29A which are formed on the wheel arms. Alternatively, the sockets could theoretically be eliminated; and cup-shaped seats could be formed on the upper surfaces of the main wheel arms to hold the ends of the saddle link. The yoke would secure the saddle link in engagement with the main wheel arm, in a manner similar to that described, although the yoke may have to be mounted so that its pivot connection to the frame is below and toward the rear of the engagement point between the saddle link and yoke.

In any case, it would be possible to achieve the overall objective of the invention, namely, to permit one gauge wheel to raise upon hitting an obstruction or to lower upon encountering a depression in the soil, while having the other gauge wheel move (i.e., rotate about the spindle 37) in the opposite direction. Ideally, one gauge wheel will raise an amount and the other will lower by approximately the same amount. But the row unit frame, and thus the furrow opener or any other soil working tool carried by the frame, will raise (or lower) by approximately one-half the distance moved by the wheel encountering the obstruction.

It will further be appreciated that the engagement between the saddle link and the yoke is a rocking, sliding surface engagement when considering the entire range of adjustment and movement of the gauge wheel arms. This is because the saddle link and yoke are not directly connected, as by pivot or bolt or the like, although the saddle shape of the bearing surface 25A restrains the lateral movement of the yoke to some extent. Moreover, it will be understood that the yoke is formed into a closed loop for reasons of strength, not necessarily function. The yoke could be a hook shape or any of a number of other shapes or structures and still perform its required functions in interacting with the saddle link, which also could have various shapes and still function correctly.

Having thus disclosed in detail a preferred embodiment of the invention, persons skilled in the art will be able to modify the structure which has been illustrated and to substitute equivalent elements for those disclosed while continuing to practice the principle of the invention; and it is, therefore, intended that all such modifications and substitutions be covered as they are embraced within the spirit and scope of the appended claims.

What is claimed is:

1. In a row unit adapted to be mounted to an agricultural implement frame, the combination comprising: a row unit frame; a ground-engaging tool carried on said row unit frame for engaging the soil in use; first and second gauge wheels; first and second gauge wheel arms carrying said first and second gauge wheels respectively and independently pivotally mounted on said row unit frame to set an operating depth of said tool; a first link elongated in a direction transverse of a direction of travel of said row unit and having first and second ends rotationally coupled respectively to said first and second gauge wheel arms, said first link defining a first bearing surface at an intermediate location; a second link mounted to said row unit frame and defining a second bearing surface engaging said first bearing surface such that said second link restrains translational movement of a central portion of said first link in one direction while permitting free rotational movement between the ends of said first link and their associated wheel arms about an axis extending in said direction of elongation of said first link.

2. The apparatus of claim 1 characterized in that said first and second bearing surfaces are in rocking engagement when said row unit is in a use position with said tool engaging the soil and said first and second bearing surfaces are not otherwise directly connected.

3. The apparatus of claim 2 wherein said first bearing surface has a convex curvature in the vertical direction when said gauge wheels are on level ground and a concave curvature in a lateral direction to define a saddle bearing surface.

4. The apparatus of claim 3 wherein said second link is a curved member defining a closed loop and having an inner surface and a central opening, said first link extending through said central opening of said second link and said first bearing surface engaging the inner surface of said closed loop of said second link in said rocking engagement.

5. The apparatus of claim 4 wherein said saddle bearing surface is shaped to include first and second projecting ears spaced to straddle said second link and to guide said second link into reseating engagement with said first link in the event said first and second links disengage.

6. The apparatus of claim 1 further comprising means for mounting said second link for rotation about a horizontal axis transverse of the direction of travel.

7. The apparatus of claim 1 further comprising an adjustment handle pivotally mounted to said row unit frame for movement in a direction; means for securing said handle to said frame at an adjusted position; means for pivotally mounting said second link to said handle, said gauge wheel arms each being pivotally mounted to said row unit frame for rotation about a common axis; and wherein said gauge wheel arms include extensions defining sockets for receiving respectively associated ends of said first link and permitting rotation of said first link.

8. The apparatus of claim 1 wherein said first link is elongated and said first and second ends of said first link are located on a common axis and are rounded and received in said respective sockets of said extensions of said wheel arms for rotational movement in said sockets, said rounded ends of said first link being oblong in cross section; and said sockets being generally rectangular to receive respectively said rounded ends of said first link to define limits to the rotation of said first link about said common axis of said rounded ends thereof.

9. The apparatus of claim 7 wherein said adjustment handle includes a forked member pivotally mounted at one end to said row unit frame and including a projection at an other end, and wherein said handle is telescopically received on said projection; said handle further including a spring for urging said handle upward and away from said forked member, said second link being pivotally mounted to said forked member, said row unit frame including a cover providing a slotted rack receiving said handle, said handle including projections adapted to be received in said slotted rack for securing said handle in an adjusted position.

10. The apparatus of claim 1 wherein said row unit is a planter row unit and said ground-engaging tool is a disc furrow opener carried by said row unit frame.

11. In a planter row unit, the combination comprising: a row unit frame; a furrow opener carried by said row unit frame; first and second wheel arms, each wheel arm pivotally mounted to said row unit frame; a gauge wheel mounted to each wheel arm for running ground engagement; a saddle link having first and second ends engaging respectively said first and second wheel arms, said saddle link defining an intermediate bearing surface; and a second link mounted to said frame and defining a second bearing surface in rocking engagement with said intermediate bearing surface of said saddle link, characterized in that said saddle link and said second link are not directly connected; said wheel arms, saddle link and second link being constructed and arranged such that when one of said wheel arms is raised as its associated wheel encounters an obstruction, the other wheel arm counterrotates, and its associated wheel is lowered relative to said frame whereby said opener is raised an amount approximately one-half the amount by which said wheel carried by said one wheel arm is raised.

* * * * *